United States Patent
O'Donnell et al.

(10) Patent No.: US 7,359,008 B2
(45) Date of Patent: Apr. 15, 2008

(54) DYNAMIC RANGE AND CONTRAST ENHANCEMENT FOR MICRODISPLAY

(75) Inventors: Eugene Murphy O'Donnell, Fishers, IN (US); Estill Thone Hall, Jr., Fishers, IN (US)

(73) Assignee: Thomson Licensing, Boulogne Billancourt (FR)

( * ) Notice: Subject to any disclaimer, the term of this patent is extended or adjusted under 35 U.S.C. 154(b) by 135 days.

(21) Appl. No.: 10/536,816

(22) PCT Filed: Nov. 26, 2003

(86) PCT No.: PCT/US03/37768

§ 371 (c)(1),
(2), (4) Date: May 27, 2005

(87) PCT Pub. No.: WO2004/052025

PCT Pub. Date: Jun. 17, 2004

(65) Prior Publication Data

US 2006/0114416 A1    Jun. 1, 2006

Related U.S. Application Data

(60) Provisional application No. 60/430,818, filed on Dec. 4, 2002.

(51) Int. Cl.
*G02F 1/1335* (2006.01)
*G03B 21/14* (2006.01)

(52) U.S. Cl. ............ 349/9; 349/5; 349/8; 353/20

(58) Field of Classification Search ............ 349/5, 349/6, 8, 9; 353/20, 31, 33–34, 37, 84
See application file for complete search history.

(56) References Cited

U.S. PATENT DOCUMENTS

| 5,111,315 A | * | 5/1992 | Ledebuhr ............... 349/5 |
| 5,805,243 A | * | 9/1998 | Hatano et al. .......... 349/5 |
| 6,082,861 A | * | 7/2000 | Dove et al. ............ 353/20 |
| 6,280,034 B1 | * | 8/2001 | Brennesholtz .......... 353/20 |
| 6,304,302 B1 | | 10/2001 | Huang et al. |
| 6,402,323 B1 | * | 6/2002 | Shiue et al. ........... 353/20 |
| 6,417,892 B1 | * | 7/2002 | Sharp et al. ........... 348/742 |
| 6,561,557 B2 | | 5/2003 | Choi |

(Continued)

FOREIGN PATENT DOCUMENTS

EP    1161103    12/2001

(Continued)

OTHER PUBLICATIONS

Search Report Dated Apr. 16, 2004.

*Primary Examiner*—Andrew Schechter
*Assistant Examiner*—Lauren Nguyen
(74) *Attorney, Agent, or Firm*—Joseph J. Laks; Harvey D. Fried; Patricia Verlangieri

(57) ABSTRACT

The invention relates to a light valve system that enhances the contrast ratio for light and dark video images and reduces contouring artifacts. The light valve system comprises a color selection device configured to temporally attenuate component color bands of light to correspond with a video input signal. A first polarizing beam splitter configured to polarize the component color bands into oppositely polarized components, and a microdisplay configured to receive at least one of the oppositely polarized components for forming a projected light matrix.

7 Claims, 3 Drawing Sheets

U.S. PATENT DOCUMENTS 6,561,652 B1 * 5/2003 Kwok et al. ................... 353/31
6,626,540 B2 * 9/2003 Ouchi et al. ................... 353/31
6,637,888 B1 10/2003 Haven
6,650,377 B2 * 11/2003 Robinson et al. .............. 349/9

2003/0103171 A1 6/2003 Hall, Jr. et al.

FOREIGN PATENT DOCUMENTS

WO  WO 03/017654  2/2003

* cited by examiner

DYNAMIC RANGE AND CONTRAST ENHANCEMENT FOR MICRODISPLAY

CROSS-REFERENCE TO RELATED APPLICATIONS

This application claims the benefit, under 35 U.S.C. § 365 of International Application PCT/US03/37768, filed Nov. 26, 2003, which was published in accordance with PCT Article 21(2) on Jun. 17, 2004 in English and which claims the benefit of U.S. provisional patent application No. 60/430,818, filed Dec. 4, 2002.

FIELD OF THE INVENTION

The invention relates to a light valve system and, more particularly, to a light valve system with a microdisplay for use in a rear projection television.

BACKGROUND OF THE INVENTION

In a conventional light valve system for, example in displays such as, rear projection televisions (RPTVs), digital cinema, etc., white light output from a lamp is directed to a microdisplay such as a liquid crystal display (LCD), liquid crystal on silicon (LCOS), or digital light processing (DLP) system, through a series of integrating and collimating optics. In the LCD or LCOS systems, white light is separated into its component red, green, and blue (RGB) bands of light, polarized by a polarizing beam splitter (PBS) in the case of LCOS, and directed onto the microdisplay. The microdisplay has a matrix of pixels. The microdisplay operates to modulate each of the pixels of the component RGB bands of incident light by a gray-scale factor control output from a controller based on a video input signal to form a light matrix of discrete modulated light signals or pixels. The light matrix is reflected or output from the microdisplay and directed to a system of projection lenses that projects the modulated light onto a display screen, combining the pixels of light to form a video image.

In the DLP system, the white light is separated into its component RGB bands of light, and reflected onto a DLP microdisplay. The microdisplay is a semiconductor device containing an array of hinge-mounted microscopic mirrors. Each of the mirrors corresponds to one pixel in a video image input to the microdisplay. When the semiconductor is driven by the video input signal, the mirrors are tilted or switched on and off to reflect all or some of the incident light. The array of pixels reflected from the mirrors form a light matrix corresponding to the video-input signal. The light matrix is reflected or output from the microdisplay and directed to a projection lens system that projects the modulated light onto a display screen to form a video image.

A disadvantage of these display systems is that the video images projected in a dark state scene are inferior in quality to the video images that are projected in a bright state scene. In the LCD or LCOS systems, the difference in quality occurs because the amount of light directed onto the microdisplay remains constant regardless of the brightness of the video image input to the microdisplay. Gray-scale variation from pixel to pixel is thereby limited by the number of bits used to process the video-input signal. Because the video input signal is a fixed number of bits, which corresponds to the full scale of light, there tend to be very few bits available for subtle differences in darker areas of the video image. For example, if the microdisplay is capable of reproducing 1024 gray shades (10-bit output digital to analog converter (DAC)) when the program contains only 0 to 64 gray shades, the net effect is that contrast appears poor and the video image appears to have a severe level of noise and contouring due to quantization effects and truncation effects. The DLP system suffers from more severe contouring effects than the LCOS or LCD systems due to the intrinsically linear response of the semiconductor.

To alleviate the differences in quality occurring between the light and dark video images, it is known to increase the contrast of the microdisplay itself. Increasing the contrast of the microdisplay, however, leads to very high data rates, very high resolution DAC's, and very critical optical and liquid crystal performance requirements. It is, therefore, desirable to develop a light valve system that enhances the contrast ratio for the video images, particularly in dark video images, and reduces contouring artifacts.

SUMMARY OF THE INVENTION

The invention relates to a light valve system that comprises a color selection device configured to temporally attenuate component color bands of light to correspond with a video input signal. A first polarizing beam splitter configured to polarize the component color bands into oppositely polarized components, and a microdisplay configured to receive at least one of the oppositely polarized components for forming a projected light matrix.

The invention further relates to a light valve system that comprises a color selection device configured to temporally separate light into its component color bands to correspond with a video input signal. A first polarizing beam splitter configured to polarize the component color bands into a first set of oppositely polarized components. First and second liquid crystal displays. Each of the first and second liquid crystal displays configured to receive one of the first set of oppositely polarized components for forming first and second light matrices, respectively. A second polarizing beam splitter configured to receive the first and second light matrices for separating the first and second light matrices into a second set of oppositely polarized components, and a microdisplay configured to receive at least one of the second set of oppositely polarized components for forming a projected light matrix.

BRIEF DESCRIPTION OF THE DRAWINGS

The invention will be described in greater detail with reference to the following figures, wherein.

DETAILED DESCRIPTION OF THE PREFERRED EMBODIMENTS

Figure 1:
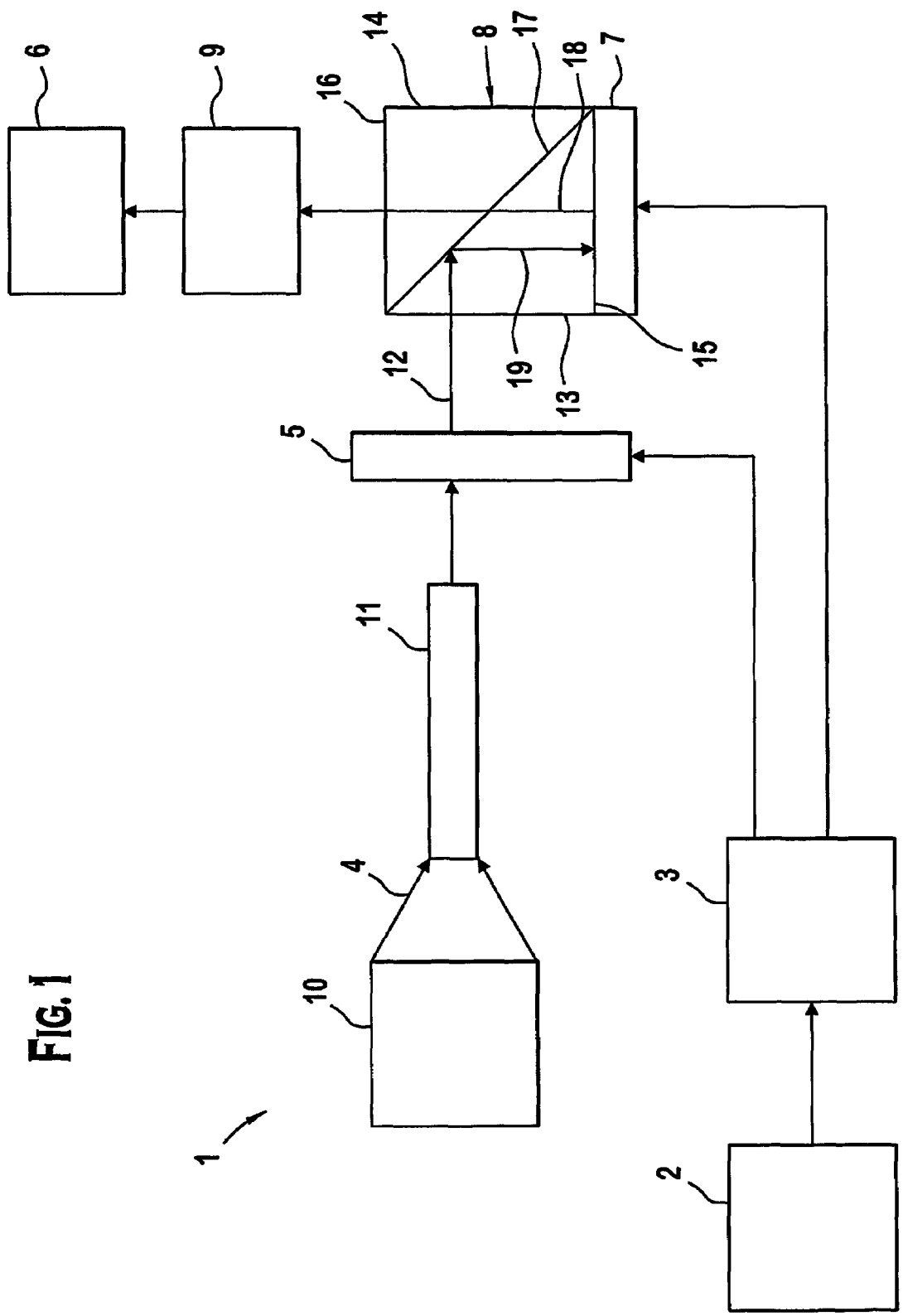
FIG. 1 is block diagram of a light valve system according to a first embodiment of the invention.

FIG. 1 shows a light valve system 1 according to a first embodiment of the invention. The system 1 includes a lamp 10. The lamp 10 generates white light 4 and projects the white light 4 toward a set of illumination optics 11. The illumination optics 11 may include, for example, a polarizer and/or an integrator. In this embodiment a polarizer is included to rotate incident light to an s-polarization. The illumination optics 11 directs a telecentric beam of the white s-polarized light 4 toward a color selection device 5. In the illustrated embodiment, the color selection device 5 is a color switching device, which is an optical device having several layers of liquid crystal displays stacked together. Examples of such a color selection device 5 include the COLORSWITCH® made by ColorLink, Inc. of Boulder, Colo. and the Application Specific Integrated Lens (ASIL) made by DigiLens, Inc. of Sunnyvale, Calif. The white light 4 enters the color selection device 5, and the color selection device 5 temporally filters the white light 4 incident thereon into sequential component red, green, and blue (RGB) bands of light 12. A selected band of light is transmitted or reflected depending on a digital control signal voltage applied to the color selection device by a display controller 3. The color selection device 5 also has an on/off state voltage input for receiving a control signal from the display controller 3. When the voltage level from the display controller 3 is high, it drives the color selection device 5 to an off state and when the voltage level from the display controller 3 is low, it drives the color selection device 5 to an on state in which light is transmitted therethrough. The display controller 3, by virtue of its processing of the video-input signal to the microdisplay 7, performs analysis on the video signal to determine its content. In this analysis, the display controller 3 analyzes the video-input signal on a pixel-by-pixel basis for the frame to be displayed. If none of the pixel input values exceed half of full scale, then the voltage level controlling attenuation in the color selection device 5 is set at 50% of full scale. If on the other hand the input pixel values are all zero thus indicating a full black screen, the voltage level controlling a color selection device is reduced to the full on state voltage. This attenuation control enhances contrast especially in frames containing mostly dark content. Since ultimate contrast is the product of contrast achieved through the optical components in the system, if for example the color selection device 5 has a contrast of 50:1 and the microdisplay 7 has a contrast of 600:1 then the measured sequential contrast is 30000:1 allowing for improved contrast levels especially in the dark state.

The display controller 3 is programmed with the transfer function of the microdisplay 7. To program the display controller 3 the microdisplay 7 may be calibrated at a factory level or auto-calibrated by photosensors in a cabinet or a projection light path, e.g., behind a folding mirror. Because the calibration may be performed in binary steps, the calibration would take no more than a few seconds and may be performed during normal operation after the video-input signal is known. As a result, the dynamic contrast of the system 1 is improved without the cost of any additional hardware, and a customer has the option of reducing the peak brightness of the video image as she chooses without producing undesired contouring effects.

The sequential component RGB bands of light 12 exit the color selection device 5 and are directed toward a polarizing beam splitter 8 (PBS). Incident s-polarized components 19 of the incident light 12 are reflected from the polarizing surface 17 to a third surface 15. A microdisplay 7 is disposed beyond the third surface 15 of the PBS 8, and the s-polarized component 19 of the light 12 is incident thereon.

In the illustrated embodiment, the microdisplay 7 is a liquid crystal on silicon (LCOS) imager. Alternatively, a liquid crystal display (LCD) may be used and the optical system adjusted accordingly. The LCOS microdisplay 7 serves to modulate incident light with video signal coming from the display controller 3. Each of the pixels of the projected light matrix 18 has an intensity or luminance proportional to the individual gray scale value provided for that pixel in the microdisplay 7. As a result of the modulation, the LCOS microdisplay 7 reflects a light matrix 18 comprising a matrix of pixels or discreet dots of p-polarized light back through the third surface 15 of the PBS 8. The p-polarized components of the projected light matrix 18 pass through the polarizing surface 17 and out of the PBS 8 through a fourth surface 16. The projected light matrix 18 is directed from the fourth surface 16 to a projection lens system 9. The projection lens system 9 projects the light matrix 18 onto a display screen 6, combining the pixels of light to form the video image corresponding to the video input signal 2.

Figure 2:
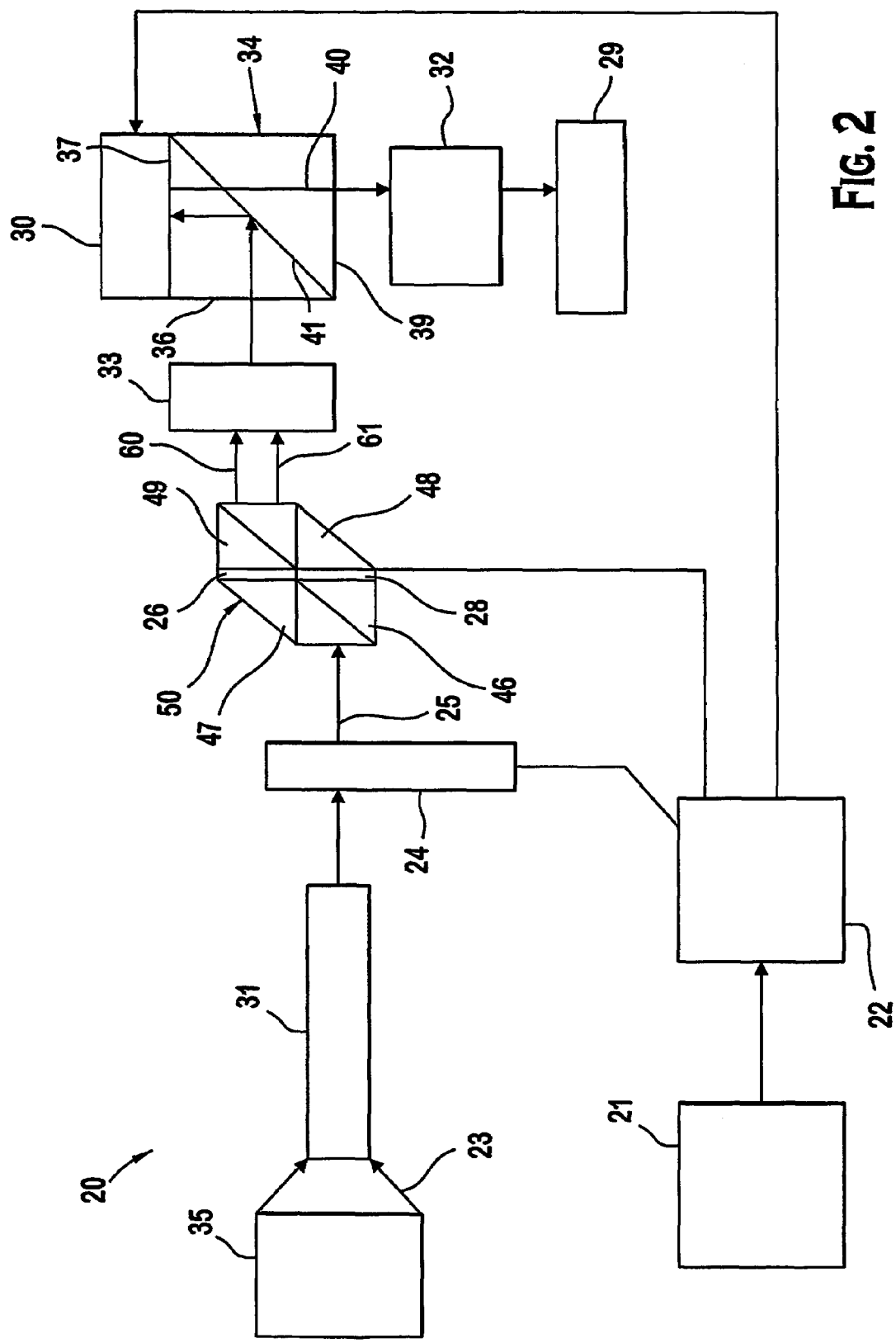
FIG. 2 is block diagram of a light valve system according to a second embodiment of the invention.

FIG. 2 shows a light valve system 20 according to a second embodiment of the invention. The system 20 includes a lamp 35. The lamp 35 generates white light 23 and projects the white light 23 toward illumination optics 31. The illumination optics 31 may include, for example, an integrator, such as, a sequential color recapture (SCR) integrator. The integrator 31 directs a telecentric beam of the white light 23 toward a color selection device 24. In the illustrated embodiment, the color selection device 24 is a color wheel, which has a disc with fan-shaped sectors uniformly disposed along a circumference of the disk. The sectors filter the white light 23 incident thereon into its component RGB bands of light 25 in a timed sequence corresponding to color wheel rotation. The color selection device 24 is rotated by a motor (not shown) and is controlled by a display controller 22 to transmit corresponding component RGB bands of light 25 in synchronization with a video input signal 21 to transmit the respective component RGB bands of light 25 on a frame-by-frame basis.

Figure 3:
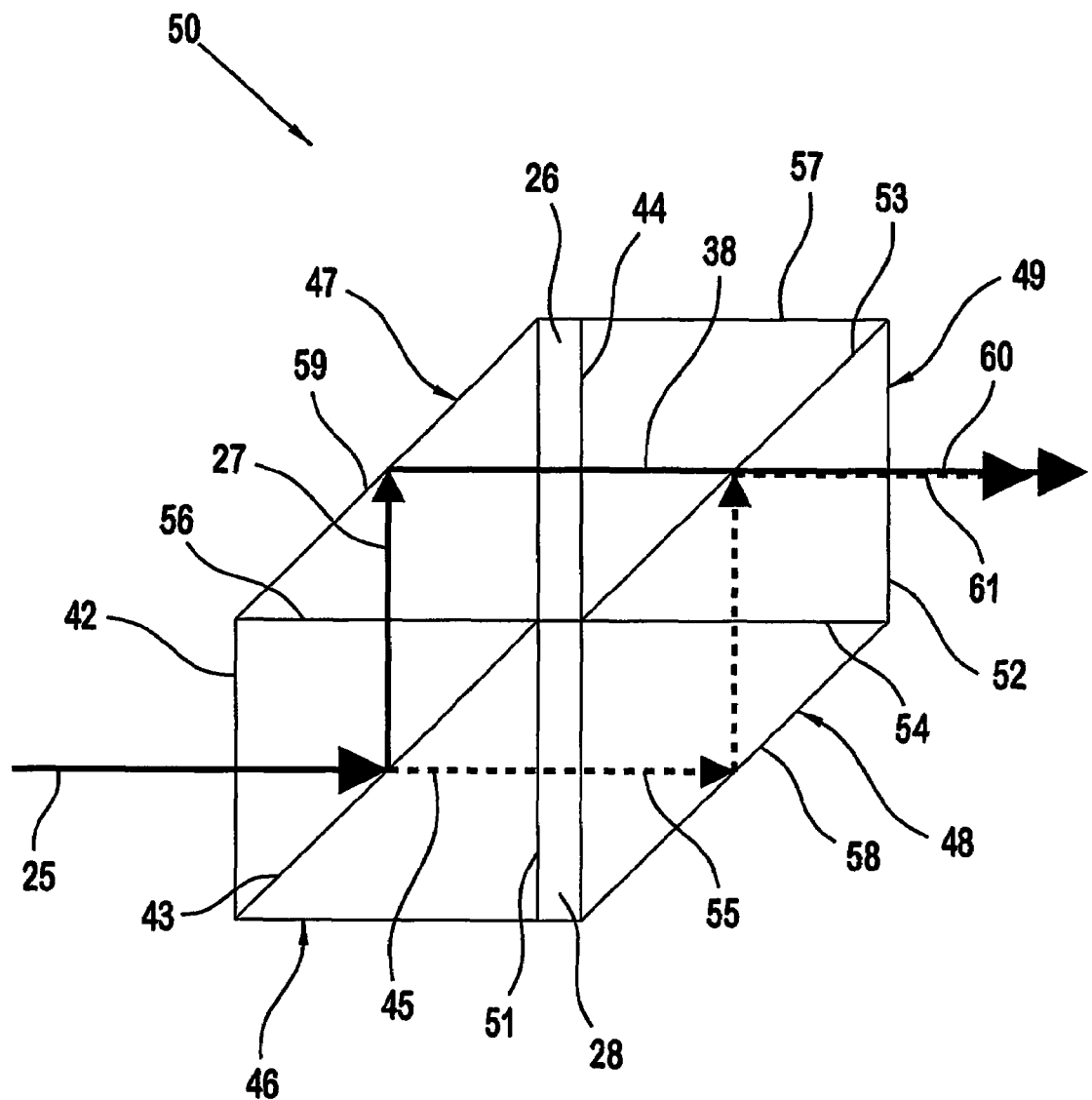
FIG. 3 is a schematic diagram of a polarizing beam splitter arrangement for use in the system of FIG. 2.

The component RGB bands of light 25 are directed toward a PBS arrangement 50. The PBS arrangement 50 includes first and second PBSs 46, 49, first and second mirror prisms 47, 48, and first and second LCDs 26, 28. Alternatively, the first and second LCDs 26, 28 may be arranged before the integrator 31. As shown in FIG. 3, the component RGB bands of light 25 enter a first face 42 of the first PBS 46 and are polarized by a first polarizing surface 43 to have an s-polarized component 27 and a p-polarized component 45. The path of the s-polarized component 27 of the RGB bands of light 25 through the PBS arrangement 50 will first be described in greater detail, and then, the path of the p-polarized 45 component will be described in greater detail.

The s-polarized component 27 is reflected through a second face 56 of the first PBS 46 and is received in the first mirror prism 47. The s-polarized component 27 is reflected by a first mirror surface 59 out of the first mirror prism 47 and toward the first LCD 26. The first LCD 26 is for example, a single cell panel containing a matrix of liquid cells coupled to an electrical signal from the display controller 22. The electrical signal controls the LCD 26 to have it either rotate polarization of light passing therethrough or pass the light without rotation.

As a result the first LCD 26 transmits a first light matrix 38 comprising a matrix of pixels or discreet dots of light with s-polarized and p-polarized components. The first light matrix 38 enters a first face 44 of the second PBS 49 and is polarized by a second polarizing surface 53. The s-polarized component (not shown) of the first light matrix 38 is reflected through a second face 57 of the second PBS 49 and is discarded while, the p-polarized component 60 of the first light matrix 38 passes through the second polarizing surface 53 and out of the second PBS 49 through a third face 52 toward illumination lens 33.

The p-polarized component 45 of the component RGB band of light 25 passes through the first polarizing surface 43 and through a third face 51 of the first PBS 46 toward the second LCD 28. The second LCD 28 is identical to the first LCD 26 in structure and function and, as such, further description thereof has been omitted. The second LCD 26 transmits a second light matrix 55 comprising a matrix of pixels or discreet dots of light with s-polarized and p-polarized components. The second light matrix 55 enters the second mirror prism 48 and is reflected by a second mirror surface 58 out of the second mirror prism 48 and toward the second PBS 49. The second light matrix 55 enters a fourth face 54 of the second PBS 49 and is polarized by the second polarizing surface 53. The p-polarized component (not shown) of the second light matrix 55 passes through the second polarizing surface 53 and is discolored through second face 57 of the second PBS 49. The s-polarized component 61 of the second light matrix 55 is reflected out of the second PBS 49 through the third face 52 and is received in a light stop (not shown) in combination with the s-polarized component 45, so that there is a fairly low loss of total brightness.

As shown in FIG. 2, the s-polarized component 61 of the second light matrix 55 and the p-polarized component 60 of the first light matrix 38 are simultaneously focused by illumination lenses 33 into a third mirror prism 34 for high-through-put efficiency. The third mirror prism 34 may be, for example, a total internal reflection (TIR) prism or off axis optics. The s-polarized component 61 of the second light matrix 55 and the p-polarized component 60 of the first light matrix 38 pass through a first surface 36 of the third mirror prism 34. The s-polarized component 61 of the second light matrix 55 and the p-polarized component 60 of the first light matrix 38 are reflected at an angle away from a reflection surface 41 of the third mirror prism 34 and through a third surface 37 the third mirror prism 34. A DLP microdisplay 30 is disposed beyond the third surface 37 of the mirror prism 37, and the combined s-polarized and p-polarized components 60, 61 are incident thereon.

The DLP microdisplay 30 may be any suitable digital light processor (DLP), such as the DLP made by Texas Instruments Incorporated of Dallas, Tex. The microdisplay 30 has an optical semiconductor (not shown), such as the DIGITAL MICROMIRROR DEVICE made by Texas Instruments Incorporated of Dallas, Tex. The semiconductor contains an array of hinge-mounted microscopic mirrors. Each of the mirrors corresponds to one pixel in a video image (not shown) of the video-input signal 21. When the semiconductor is driven by the controller 22 based on video input signal 21, the mirrors are tilted or switched on or off to reflect all or some of the first and second light matrices 51, 49. The array of pixels reflected from the switched mirrors forms a projected light matrix 40 corresponding to the video-input signal 21 from the display controller 22.

Operation of the LED's 26, 28 serve as attenuation control whereby some p-polarized and some s-polarized light is discarded before recombination. For example, as described above in the first embodiment if none of the video input pixel values exceeds half of full-scale, then the first and second LCDs 26, 28 control fifty percent of incident light. In an instance where the video input signal 21 indicates a full black screen, the first and second LCDs 26, 28 are set by the display controller 22 to maximum, and the microdisplay 30 is driven with zeros to achieve very high sequential contrast. Thus, if the first and second LCD's 26, 28 have a peak attenuation of 50:1, and the microdisplay 30 has a sequential contrast of at least 600:1, then the measured sequential contrast is 30,000:1.

The projected light matrix 40 is reflected from the microdisplay 30 back through the third surface 37 of the TIR prism 34. The projected light matrix 40 passes through the reflecting surface 41 of the TIR prism 34 and out of the TIR prism 34 through a fourth surface 39. The projected light matrix 40 is directed from the fourth surface 39 to a system of projection lenses 32. The projection lenses 32 project the projected light matrix 40 onto a display screen 29, to form the video image corresponding to the video input signal 21.

The system 20 has the benefit of allowing the microdisplay 30 to be illuminated with alternating polarizations of light, which allows for polarization-based stereographic imaging.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A light valve system, comprising:
   a color selection device configured to temporally separate light into component color bands to correspond with a video input signal;
   a first polarizing beam splitter configured to polarize the component color bands into a first set of oppositely polarized components;
   first and second liquid crystal displays, each of the first and second liquid crystal displays configured to receive one of the first set of oppositely polarized components for forming first and second light matrices, respectively;
   a second polarizing beam splitter configured to receive the first and second light matrices for combining the first and second light matrices into a second set of oppositely polarized components; and
   a microdisplay configured to receive at least one of the second set of oppositely polarized components for forming a projected light matrix.

2. The light valve system of claim 1, wherein the microdisplay is a digital light processor.

3. The light valve system of claim 1, further comprising an integrator.

4. The light valve system of claim 1, further comprising a polarizer.

5. The light valve system of claim 1, further comprising projection lenses and a display screen.

6. The light valve system of claim 1, further comprising a mirror prism.

7. The light valve system of claim 1, further comprising illumination lenses.

* * * * *